Feb. 6, 1951 — L. F. CROOK — 2,540,713
FISHING APPLIANCE
Filed May 4, 1949
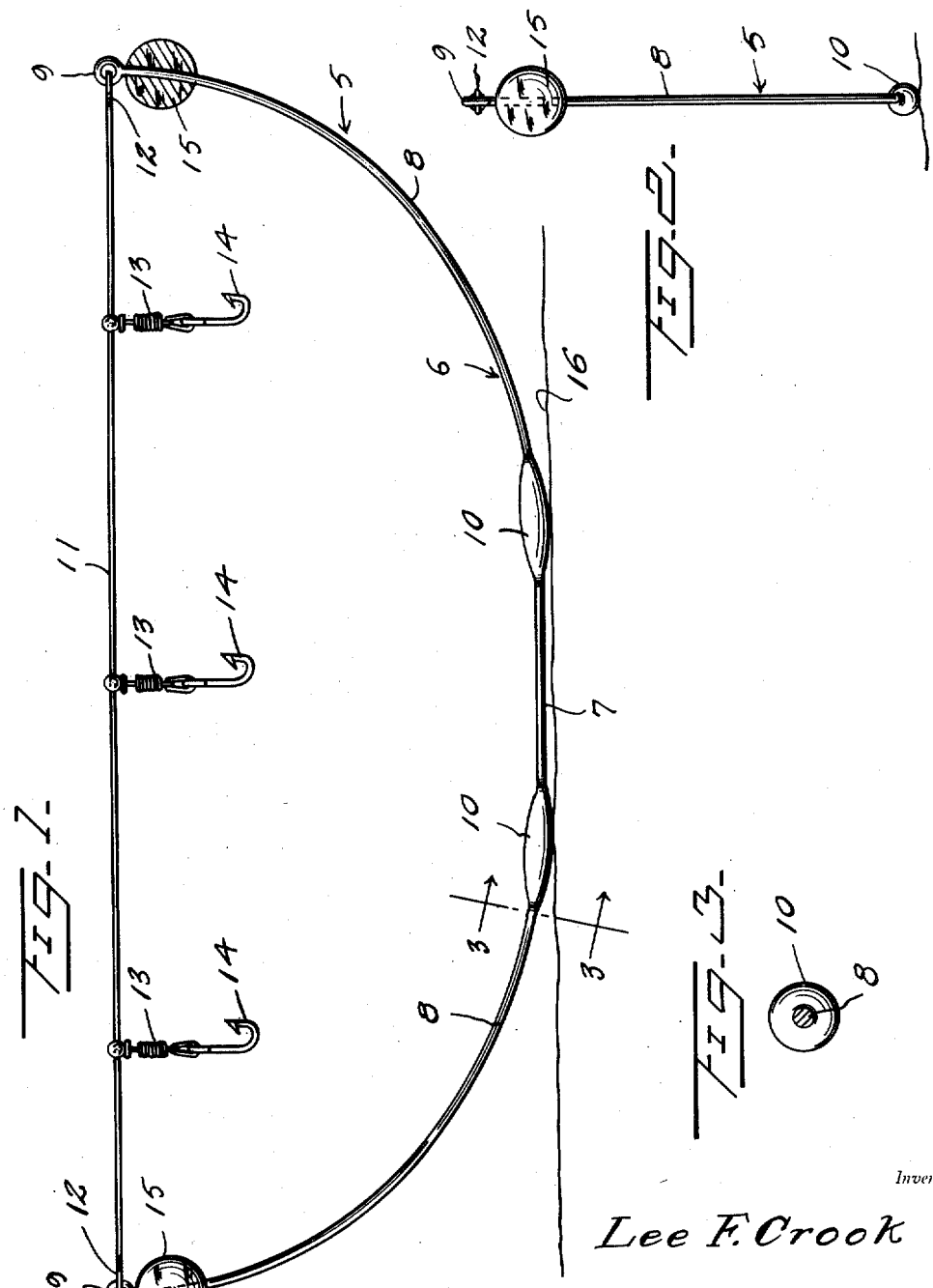
Inventor
Lee F. Crook
By John N. Randolph
Attorney Patented Feb. 6, 1951

2,540,713

UNITED STATES PATENT OFFICE 2,540,713

FISHING APPLIANCE

Lee F. Crook, Salisbury, N. C.

Application May 4, 1949, Serial No. 91,300

4 Claims. (Cl. 43—43.15)

This invention relates to a novel appliance or device for use in fishing and which is primarily intended and adapted for use as a casting device to maintain the fishhooks out of contact with the bottom of a body of water and while the device is being retrieved along the bottom to thereby eliminate snagging of the fishhooks on bottom obstructions and loss of the hooks and fishing line.

More particularly, it is an aim of the present invention to provide a device having a weighted runner for movement along the bottom and buoyant means for maintaining the device in an upright position for supporting the hooks carried thereby in an elevated position at all times and to insure that the bottom portion of the runner will assume a lowermost position as soon as the device is submerged and will maintain this position while the device sinks to the bottom and while it is drawn therealong.

Still another object of the invention is to provide a fishing appliance which is well adapted for use for any bottom fishing for supporting the fishhooks at a predetermined level above the bottom to eliminate all danger of snagging the fishhooks or a fishing sinker.

A further object of the invention is to provide a device of the aforedescribed character which may be made in various sizes and which may be quickly and easily attached to the fishing line and will provide a self-contained unit including hooks and sinker.

Still a further object of the invention is to provide a device of the aforedescribed character which may be very economically manufactured and sold and which will be extremely efficient and durable for accomplishing its intended purposes.

Various other objects and advantages of the invention will hereinafter become more fully apparent from the following description of the drawing, illustrating a presently preferred embodiment thereof, and wherein:

Figure 1 is a side elevational view showing the fishing device in the normal position which it will assume when in use;

Figure 2 is an end elevational view thereof, and

Figure 3 is a cross sectional view of the appliance taken substantially along a plane as indicated by the line 3—3 of Figure 1.

Referring more specifically to the drawing, the fishing appliance in its entirety is designated generally 5 and includes a strand of relatively heavy gauge wire, designated generally 6 having a substantially straight intermediate portion 7 and corresponding upwardly curved end portions 8, each of which is preferably longer than the intermediate portion 7 and which end portions 8 terminate at their upper, free ends in eyes 9 which are disposed at the same level above the portion 7. Said portion 7 is provided adjacent its ends with enlargements 10 which may be suitably secured thereto or formed integral therewith and which provide weighted elements or sinkers and which may be formed of lead.

A strand 11, preferably of nylon line extends between the eyes 9 and has its end portions 12 suitably tied or otherwise fastened thereto and so that the line 11 will be substantially taut. A plurality of conventional swivels 13 are suitably fastened to the line 11 in longitudinally spaced relationship to one another and depend downwardly therefrom and a conventional fishhook 14 is attached to the depending end of each swivel 13 for supporting the fishhooks beneath the line 11 and above or spaced from the runner portions 7 and 8.

A buoyant member or float such as a cork sphere 15 is preferably secured to each upturned wire end 8 beneath and adjacent its eye 9 or said floats 15 may be attached to the line 11 or otherwise disposed above the level of the sinkers or weights 10.

From the foregoing it will be readily apparent that an end of a fishing line may be attached to either eye 9 of the fishing appliance 5 after which and assuming that the hooks 14 are suitably baited, the device 5 may be cast in a conventional manner and upon striking the water the weights or sinkers 10 will cause the device 5 to sink to the bottom in an upright position as seen in Figures 1 and 2 so that the sinkers 10, which are elongated and tapered toward their ends will engage the bottom 16 and possibly together with the intermediate runner portion 7. The device 5 will be held in this upright position by the floats 15 so that the hooks 14 will be disposed substantially above the level of the bottom 16 to prevent their being snagged while the device 5 is being retrieved along the bottom. During the retrieving operation the weights 10 and portion 7 will function similar to a sled runner for riding over the bottom 16 and the upwardly curved end portions 8 will cause the runner to readily ride over obstructions and to enable it to be easily retrieved.

It will also be readily apparent that the device 5 may be used for still fishing on the bottom of a body of water and will efficiently function to maintain the hooks 14 at a desired level above the bottom to prevent them from snagging on oyster shells or other bottom obstructions.

The appliance 5 may be made in various sizes and various other modifications and changes are contemplated and may obviously be resorted to, without departing from the spirit or scope of the invention as hereinafter defined by the appended claims.

I claim as my invention:

1. A fishing appliance of the character described comprising an elongated runner member having upwardly curved end portions and a weighted intermediate portion, a hook supporting member extending between the terminals of said upturned end portions and adapted to support a plurality of hooks between said terminals above the level of said weighted intermediate portion and beneath the hook supporting member, and float means mounted on one of said members above the level of said intermediate portion for maintaining the runner in substantially a vertical plane when submerged in a body of water and with said intermediate portion resting on the bottom.

2. A fishing device of the character described comprising an elongated non-buoyant member having a substantially straight intermediate portion and upwardly curved ends, a hook supporting member attached to the terminals of said upwardly extending ends and extending therebetween, hooks carried by said hook supporting member between said terminals and float means mounted on one of said members adjacent said hook supporting member.

3. A fishing device as in claim 2, said elongated member having eyes at the ends thereof, and said hook supporting member comprising a flexible strand secured at its ends to said eyes.

4. A fishing device as in claim 2, said elongated member having eyes at the ends thereof, said hook supporting member comprising a flexible strand secured at its ends to said eyes, and said float means comprising float members fixedly mounted on said upwardly extending ends beneath and adjacent said eyes.

LEE F. CROOK.

REFERENCES CITED

The following references are of record in the file of this patent:

UNITED STATES PATENTS

| Number | Name | Date |
|--------|------|------|
| 523,561 | White | July 24, 1894 |
| 1,589,522 | Felix | June 22, 1926 |
| 2,054,407 | Campbell | Sept. 15, 1936 |
| 2,157,819 | Eckert | May 9, 1939 |
| 2,173,511 | Bertelli et al. | Sept. 19, 1939 |
| 2,487,229 | Finn | Nov. 8, 1949 |